(12) United States Patent
Yang et al.

(10) Patent No.: US 12,526,940 B2
(45) Date of Patent: Jan. 13, 2026

(54) ELECTRONIC DEVICE AND STATE SWITCHING METHOD THEREOF

(71) Applicant: Lenovo (Beijing) Limited, Beijing (CN)

(72) Inventors: Feng Yang, Beijing (CN); Detao You, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 134 days.

(21) Appl. No.: 18/606,970

(22) Filed: Mar. 15, 2024

(65) Prior Publication Data

US 2024/0334629 A1    Oct. 3, 2024

(30) Foreign Application Priority Data

Mar. 27, 2023 (CN) .......................... 202310309992.5

(51) Int. Cl.
*H05K 5/02* (2006.01)
*G06F 1/16* (2006.01)

(52) U.S. Cl.
CPC ......... *H05K 5/0226* (2013.01); *G06F 1/1637* (2013.01)

(58) Field of Classification Search
CPC ...... G06F 1/1637; G06F 1/1681; G06F 1/203; G06F 1/1615
See application file for complete search history.

(56) References Cited

U.S. PATENT DOCUMENTS

| | | | | |
|---|---|---|---|---|
| 10,642,309 | B2* | 5/2020 | Cheng | G06F 1/203 |
| 2013/0208436 | A1* | 8/2013 | Hu | G06F 1/1616 |
| | | | | 361/807 |
| 2013/0225001 | A1* | 8/2013 | Chang | G06F 1/166 |
| | | | | 439/625 |
| 2013/0229763 | A1* | 9/2013 | Guo | G06F 1/203 |
| | | | | 361/679.27 |
| 2014/0133095 | A1* | 5/2014 | Wu | G06F 1/1616 |
| | | | | 361/692 |
| 2017/0153677 | A1* | 6/2017 | Cheng | G06F 1/1637 |
| 2020/0142456 | A1* | 5/2020 | Hsu | G06F 1/1656 |

* cited by examiner

*Primary Examiner* — Abhishek M Rathod
(74) *Attorney, Agent, or Firm* — ANOVA LAW GROUP, PLLC

(57) ABSTRACT

An electronic device and a state switching method are provided in the present disclosure. The electronic device includes a first main body, a second main body, and a rotating-axle apparatus, where the rotating-axle apparatus connects the first main body with the second main body to make the second main body at an open state or a closed state relative to the first main body; and an air outlet is disposed on a side of the first main body. The rotating-axle apparatus is configured to, in a process of rotating the second main body around a rotation center to the open state, drive the second main body to ascend along a first direction relative to the first main body and move above the first main body to expose the air outlet.

16 Claims, 3 Drawing Sheets

ELECTRONIC DEVICE AND STATE SWITCHING METHOD THEREOF

CROSS-REFERENCE TO RELATED APPLICATION

This application claims the priority of Chinese Patent Application No. 202310309992.5, filed on Mar. 27, 2023, the content of which is incorporated herein by reference in its entirety.

TECHNICAL FIELD

The present disclosure generally relates to the field of electronic device technology, and, more particularly, relates to an electronic device and a state switching method thereof.

BACKGROUND

With the development of technology, the use of electronic devices becomes more popular, especially the use of notebook computers. Currently, two common configurations are used for rotating axles on notebook computers. One configuration is that a gap is formed on an upper housing for the rotating axle to rotate, and a rotation center of the rotating axle is configured above an upper surface of a keyboard housing. Such configuration may be beneficial to heat dissipation because an airflow from a fan on a system side is not blocked; however, the gap on the upper housing may affect overall product appearance. Another configuration is that the upper housing is intact, and the rotation center of the rotating axle is configured below the upper surface of the keyboard housing. When the fan on the system side blows out air, the air may be blocked by a screen. Although such configuration keeps the upper housing intact and does not affect overall product appearance due to the gap, such configuration may not be beneficial for heat dissipation; and the air from the fan may blow towards the screen, which may cause screen temperature to rise and affect screen service life.

SUMMARY

One aspect of the present disclosure provides an electronic device. The electronic device includes a first main body, a second main body, and a rotating-axle apparatus, where the rotating-axle apparatus connects the first main body with the second main body to make the second main body at an open state or a closed state relative to the first main body; and an air outlet is disposed on a side of the first main body. The rotating-axle apparatus is configured to, in a process of rotating the second main body around a rotation center to the open state, drive the second main body to ascend along a first direction relative to the first main body and move above the first main body to expose the air outlet.

Another aspect of the present disclosure provides a state switching method, applied to an electronic device. The electronic device includes a first main body, a second main body, and a rotating-axle apparatus. The method includes rotating the second main body around a rotation center to make the rotation center ascend to above the first main body along a first direction, such that the second main body is switched from a closed state to an open state relative to the first main body; and rotating the second main body around the rotation center to make the rotation center descend from above the first main body to inside the first main body along the first direction, such that the second main body is switched from the open state to the closed state relative to the first main body.

Other aspects of the present disclosure may be understood by those skilled in the art in light of the description, the claims, and the drawings of the present disclosure.

BRIEF DESCRIPTION OF THE DRAWINGS

The following drawings, as a part of the present disclosure herein, are used to understand the present disclosure. Embodiments of the disclosure are illustrated in the drawings and corresponding description, which are used to explain the principle of the present disclosure.

DETAILED DESCRIPTION

In the following description, details are provided to facilitate a thorough understanding of the present disclosure. However, those skilled in the art should understand that the following description merely illustrates optional embodiments of the present disclosure, and the disclosure may be implemented without one or more of these details. In addition, in order to avoid confusion with the present disclosure, certain technical features that are well known in the art are not described in detail.

Figure 1:
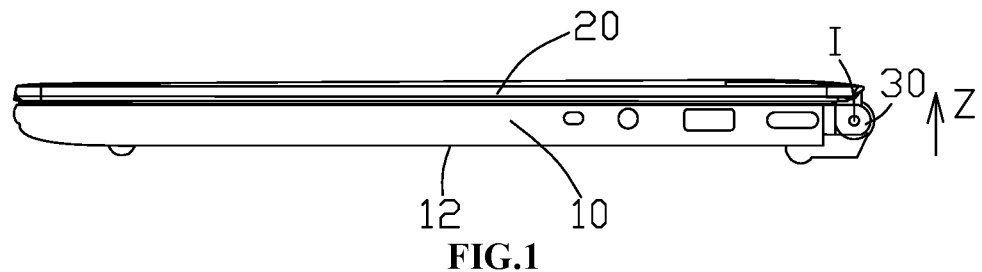
FIG. 1 illustrates a side view of an electronic device that a second main body is at a closed state relative to a first main body according to various embodiments of the present disclosure.
Figure 2:
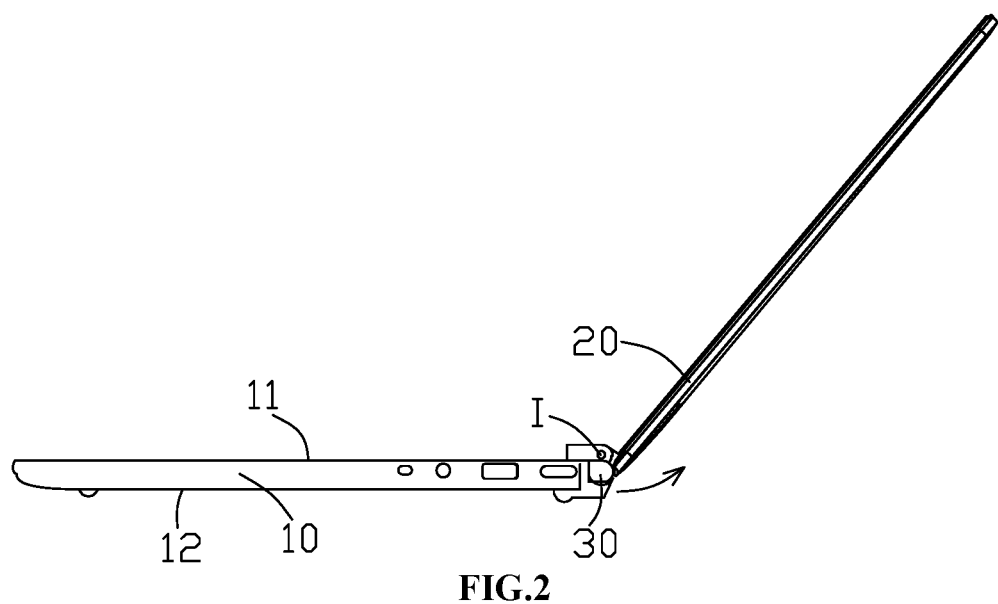
FIG. 2 illustrates a side view of an electronic device that a second main body is at an open state relative to a first main body according to various embodiments of the present disclosure.

Referring to FIGS. 1-2, embodiments of the present disclosure provide an electronic device. The electronic device may include a first main body 10, a second main body 20, and a rotating-axle apparatus 30. The rotating-axle apparatus 30 may connect the first main body 10 with the second main body 20, such that the second main body 20 may have an open state (the state shown in FIG. 2) or a closed state (the state shown in FIG. 1) relative to the first main body 10. An air outlet may be disposed on a side of the first main body 10. The air outlet is not shown in drawings. Taking FIGS. 1-2 as an example, the air outlet may be disposed on the right side of the first main body 10. The rotating-axle apparatus 30 may be configured to drive the second main body 20 to ascend along the first direction relative to the first main body 10 and move above the first main body 10 during the process of rotating the second main body 20 around a rotation center I to the open state, such that the air outlet may be exposed. The first direction is a Z direction in FIG. 1, that is, the first direction and the first main body 10 satisfy a perpendicular condition. Satisfying the perpendicular condition herein indicates that the first direction is perpendicular to the first main body 10 within allowable tolerance range.

For example, the first main body 10 may include a top surface 11 and a bottom surface 12 arranged oppositely along the first direction. When the second main body 20 is at the closed state relative to the first main body 10, the rotation center I may be between the top surface 11 and the bottom surface 12; and when the second main body 20 is rotated to the open state relative to the first main body 10, the rotation center I may be above the top surface 11. Herein, the open state may be a state that is convenient for a user to use the electronic device normally. At the open state, the second main body 20 and the first main body 10 may form a certain angle with each other. The angle may be adjusted according to normal use need, for example, may be adjusted to 90°, 125° or the like. In such way, when the electronic device needs to be used, a force may be applied to the second main body 20 to rotate the second main body 20 around the rotation center I; and the rotating-axle apparatus 30 may be configured to drive the rotation center I to ascend, thereby driving the second main body 20 to ascend along the first direction relative to the first main body 10. Therefore, the second main body 20 may not cover the air outlet on the first main body 10 due to rotation, such that the air outlet may be exposed, and the heat in the first main body 10 may be dissipated from the air outlet, thereby realizing the air outlet of the electronic device to be exposed at the open state and ensuring heat dissipation during use of the electronic device.

In one embodiment of the present disclosure, the electronic device may be a portable terminal device. For example, the electronic device may be a notebook computer. Correspondingly, the first main body 10 may correspond to a system side of the notebook computer, including a keyboard housing (i.e., a part C), a bottom housing (i.e., a part D), a processor disposed between the keyboard housing and the bottom housing, a motherboard, a fan and/or the like; and the second main body 20 may corresponds to a screen side of the notebook computer, including an upper housing (i.e., a part A), a screen housing (i.e., a part B), a display screen, and/or the like. In other optional embodiments, the electronic device may also be any suitable electronic device having the rotating-axle apparatus 30, such as a mobile device, an audio system, a movie player, or the like.

Figure 3:
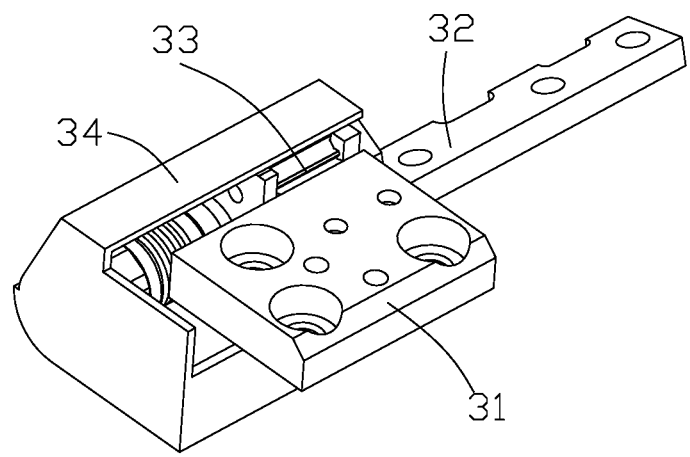
FIG. 3 illustrates a structural schematic of a rotating-axle apparatus in FIG. 1 according to various embodiments of the present disclosure.
Figure 4:
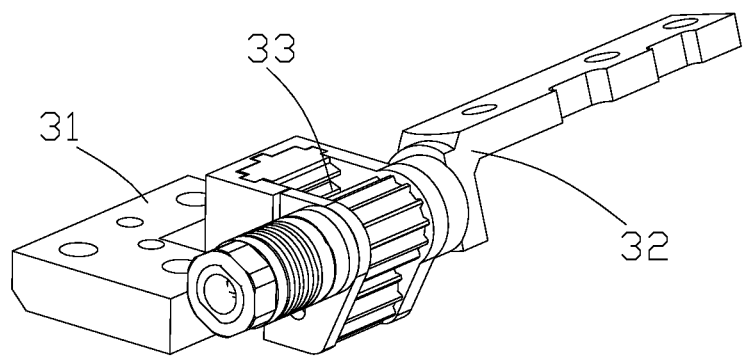
FIG. 4 illustrates a three-dimensional view of a rotating-axle apparatus in FIG. 1 after a cover is removed according to various embodiments of the present disclosure.

Referring to FIGS. 2-4, in one embodiment of the present disclosure, the rotating-axle apparatus 30 may include a first hinge unit 31, a second hinge unit 32 and a connecting unit 33. The first hinge unit 31 may be combined with the first main body 10. For example, the first hinge unit 31 may be fixedly connected to the first main body 10, such that the first hinge unit 31 may be fixedly disposed relative to the first main body 10. The second hinge unit 32 may be combined with the second main body 20. For example, the second hinge unit 32 may be fixedly connected to the second main body 20, such that the second hinge unit 32 may be fixedly disposed relative to the second main body 20. When a force is applied to the second main body 20 to rotate the second main body 20 around the rotation center I, the second hinge unit 32 may rotate together with the second main body 20. The connecting unit 33 may connect the first hinge unit 31 with the second hinge unit 32. The rotation center I may be formed on the second hinge unit 32; and during the process of rotating the second main body 20 to the open state, the rotation center I may move along the first direction to gradually move away from the first hinge unit 31. In such way, during the process of rotating the second main body 20 to the open state, the second main body 20 may rotate around the rotation center I while moving away from the first hinge unit 31 to achieve the ascending objective.

Figure 5:
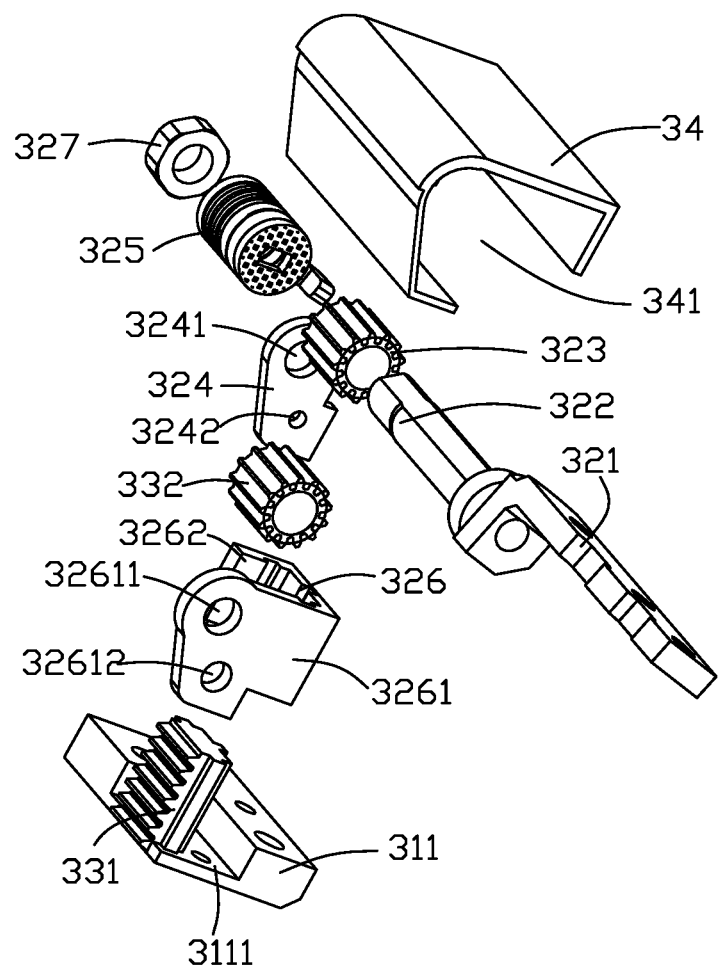
FIG. 5 illustrates an exploded view of a rotating-axle apparatus in FIG. 1 according to various embodiments of the present disclosure.
Figure 6:
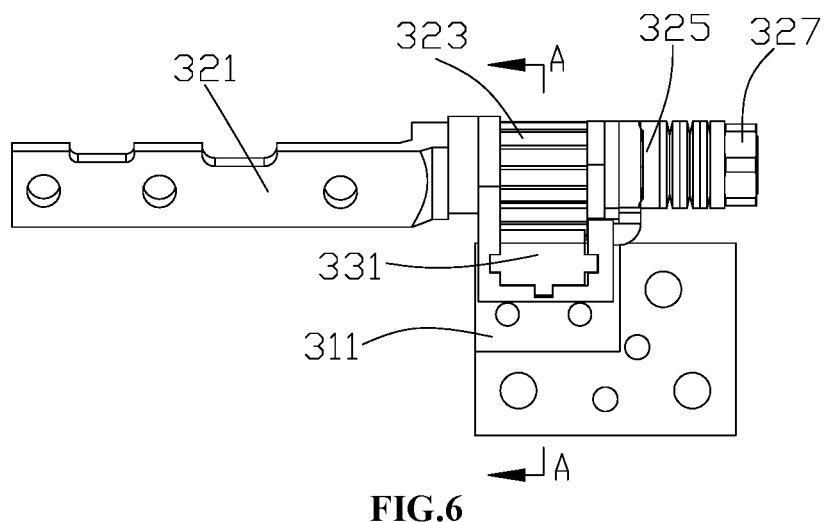
FIG. 6 illustrates a top view of a rotating-axle apparatus in FIG. 1 after a cover is removed according to various embodiments of the present disclosure.
Figure 7:
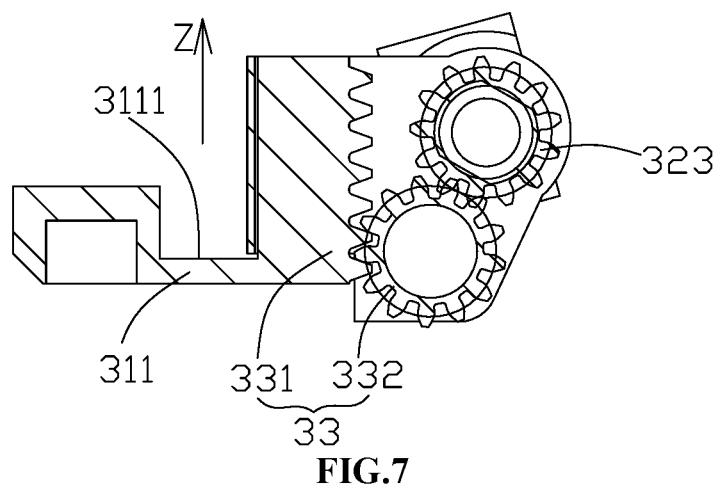
FIG. 7 illustrates a cross-sectional view along an A-A direction in FIG. 6.

Referring to FIGS. 5-7, the connecting unit 33 may include a guiding part 331 and a rotating part 332. The guiding part 331 may be disposed on the first hinge unit 31. The rotating part 332 may be coupled with the second hinge unit 32 and also coupled with the guiding part 331, such that the rotating part 332 may drive the second hinge unit 32 to move along the guiding part 331 during the process of rotating the second main body 20. Therefore, through the action of the guiding part 331, the second hinge unit 32 may move along the first direction while rotating with the second main body 20, where the first direction is the Z direction in FIG. 7.

In one embodiment of the present disclosure, the second hinge unit 32 may include a connecting part 321, a rotating axle 322 and a gear 323. The connecting part 321 may be configured to be combined with the second main body 20; the rotating axle 322 may extend out from an end of the connecting part 321; the central axis of the rotating axle 322 may form the rotation center I; and the gear 323 may be sleeved on the rotating axle 322 and capable of rotating with the rotating axle 322. Therefore, during the process of rotating the second main body 20, the gear 323 may rotate together with the rotating axle 322.

Herein, the second hinge unit 32 may also include a torsion assembly 325. The torsion assembly 325 may pass through the rotating axle 322 and the end of the torsion assembly 325 may be positioned through a fastener 327 to provide rotational resistance to the rotating axle 322. By disposing the torsion assembly 325, during the process of rotating the second main body 20, the torsion resistance generated by the torsion assembly 325 must be overcame. Therefore, when the rotational force on the second main body 20 is removed, the second main body 20 may maintain a stable open state.

Referring to FIGS. 5-7, in one embodiment of the present disclosure, the guiding part 331 may include a rack; and the rotating part 332 may be meshed with the gear 323 and the rack respectively. Herein, the rotating part 332 may be a driven wheel meshed with the gear 323. Since the rotating part 332 is restricted by the rack, the rotating part 332 may move along the rack during the rotation process, such that the second hinge unit 32 may also move along the rack, thereby making the second main body 20 to move.

In other embodiments, the guiding part 331 may also be a worm; and accordingly, the rotating part 332 may be meshed with the gear 323 and the worm respectively.

In order to facilitate the installation of the rotating part 332, the second hinge unit 32 may also include an installation bracket 324. The installation bracket 324 may be fixedly disposed relative to the rotating axle 322. The rotating part 332 may be rotatably disposed on the installation bracket 324 and meshed with the gear 323. For example, a first hole 3241 and a second hole 3242 may be formed on the installation bracket 324. The rotating axle 322 may pass through the first hole 3241. The rotating part 332 may be supported at the second hole 3242 through a connecting axle. In such way, the installation bracket 324 may not only limit an end portion of the gear 323, but also facilitate the installation of the rotating part 332.

In one embodiment of the present disclosure, along an axial direction of the rotating axle 322, the gear 323 and the torsion assembly 325 may be respectively on two sides of the installation bracket 324. In such way, the torsion assembly 325 may provide rotational resistance to the rotating axle 322 through the installation bracket 324.

Referring to FIGS. 5-6, in one embodiment of the present disclosure, a hinge housing 326 may be also disposed on the rotating axle 322; the hinge housing 326 and the installation bracket 324 may be enclosed to form an accommodating space; and the rotating part 332, the gear 323 and the guiding part 331 may be all in the accommodating space. In such way, the rotating part 332, the gear 323 and the guiding part 331 may be prevented from being exposed. On the one hand, the purpose of protecting the rotating part 332, the gear 323 and the guiding part 331 may be achieved; on the other hand, meshing transmission noise may also be reduced.

Herein, the hinge housing 326 may include a first housing 3261 opposite to the installation bracket 324. A first connecting hole 32611 and a second connecting hole 32612 may be formed at the first housing 3261; the first connecting hole 32611 may be opposite to the first hole 3241; the second connecting hole 32612 may be opposite to the second hole 3242; the rotating axle 322 may pass through both the first connecting hole 32611 and the first hole 3241; and two ends of the connecting axle passing through the rotating part 332 may be supported at the second connecting hole 32612 and the second hole 3242, respectively. In such way, the hinge housing 326 and the installation bracket 324 may not only support the rotating axle 322, but also position the gear 323 and the rotating part 332.

In order to form the accommodating space enclosed with the installation bracket 324, the hinge housing 326 may also include a second housing 3262 opposite to the first housing 3261. The first housing 3261 and the second housing 3262 may be connected to each other through a connecting housing (the connecting housing is not labeled in drawings), and the installation bracket 324 may be fixed on the second housing 3262, such that the hinge housing 326 and the installation bracket 324 may form a U-shaped accommodating space.

In order to facilitate the positioning of the rack, in one embodiment of the present disclosure, the hinge housing 326 and the rack may also be connected to each other through a guiding structure. The guiding structure may include, for example, guiding grooves disposed on the first housing 3261, the second housing 3262 and/or the connecting housing, and protrusions disposed on the rack; that is, may include protrusions disposed on the first housing 3261, the second housing 3262 and/or the connecting housing, and guiding grooves disposed on the rack. Through cooperation of the protrusions and the guiding grooves, the objective of positioning the rack may be achieved.

Herein, the rotating-axle apparatus 30 may also include a cover 34; the cover 34 may include a cover space; and the rotating axle 322, the gear 323, the torsion assembly 325, the rotating part 332, the guiding part 331, the installation bracket 324 and the hinge housing 326 may all be arranged in the cover space. Based on the arrangement of the cover 34, overall appearance of the electronic device may be improved.

Referring to FIG. 5, in one embodiment of the present disclosure, the first hinge unit 31 may include a plate-shaped part 311; and the plate-shaped part may include an installation surface 3111. The central axis of the rotating axle 322 and the installation surface 3111 may satisfy a parallel condition, and the rack and the installation surface 3111 may satisfy a perpendicular condition. It should be understood that satisfying the perpendicular condition herein indicates that the rack is perpendicular to the installation surface 3111 within allowable tolerance range. In such way, it ensures that the second main body 20 may move along the first direction relative to the first main body 10 when the second main body 20 rotates around the rotation center I.

Another aspect of the present disclosure further includes a state switching method. The state switching method may be mainly configured for state switching of above-mentioned electronic equipment. Referring to FIGS. 1-2, the state switching method may include rotating the second main body 20 around the rotation center I to make the rotation center I ascend above the first main body 10 along the first direction, such that the second main body 20 may be switched from the closed state to the open state relative to the first main body 10; and rotating the second main body 20 around the rotation center I to make the rotation center I descend from above the first main body 10 to inside the first main body 10 along the first direction, such that the second main body 20 may be switched from the open state to the closed state relative to the first main body 10.

It may be seen that after above-mentioned rotating-axle apparatus 30 is configured to connect the first main body 10 with the second main body 20 on the electronic device, the second main body 20 may be conveniently switched from the closed state to the open state, or from the open state to the closed state relative to the first main body 10 through a rotation manner.

It may be seen that in the electronic device of the present disclosure, the rotation center I may be ascended or descended through rotation when the states are switched. Furthermore, during the process of rotating the second main body 20 around the rotation center I to the open state, the rotating-axle apparatus 30 may drive the second main body 20 to ascend along the first direction relative to the first main body 10 and move above the first main body 10, such that the air outlet may be exposed, and an airflow may not be blocked when the heat is dissipated. In such way, it not only ensures the completeness of the second main body 20, but also avoids the problem that the second main body 20 blocks the air outlet at the open state to cause the screen temperature on the second main body 20 to increase, thereby further improving the service life of the screen on the second main body 20.

Compared with the existing technology, the technical solutions provided by the present disclosure may achieve at least the following beneficial effects.

For the configuration of the rotating-axle apparatus in the present disclosure, the rotation center may be ascended or descended when the states are switched. Furthermore, during the process of rotating the second main body around the rotation center to the open state, the rotating-axle apparatus may drive the second main body to ascend along the first direction relative to the first main body and move above the first main body, such that the air outlet may be exposed, and an airflow may not be blocked when the heat is dissipated. In such way, it not only ensures the completeness of the second main body, but also avoids the problem that the second main body blocks the air outlet at the open state to cause the screen temperature on the second main body to increase.

In the description of the present disclosure, it should be understood that the orientation or positional relationship indicated by the positional terms may be based on the orientation or positional relationship shown in the drawings and may be only for the convenience of describing the present disclosure and simplifying the description. Without further explanation, these orientation terms may not indicate or imply that the apparatus or element referred to must have a specific orientation or be constructed and operated in a specific orientation. Therefore, these orientation terms may not be construed as limiting the scope of the present disclosure. The locative words "inside" and "outside" refer to the inside and outside relative to the outline of each component itself.

For ease of description, spatially relative terms may be used herein. For example, "on . . . ", "above . . . ", "on an upper surface . . . ", "over" and the like may be used to describe the spatial positional relationship of one or more parts or features to other parts or features. It should be understood that spatially relative terms may not only include the orientations of parts in the drawings, but also include different orientations in use or operations. For example, if a part in the drawing is turned upside down as a whole, the part "above" or "on" other parts or features may include the part "under" or "beneath" other parts or features. Therefore, the exemplary term "above" may include two orientations "above" and "under." In addition, these parts or features may be oriented at different angles (e.g., rotated 90 degrees or other angles); and all these situations may be included in the present disclosure.

It should be noted that the terms used herein may be for the purpose of describing specific embodiments only and may not be intended to limit exemplary embodiments according to the present disclosure. For example, singular forms used herein may be intended to include plural forms as well, unless the context clearly indicates otherwise. Furthermore, it should also be understood that when the terms "comprise" and/or "include" used in the present disclosure may indicate the presence of features, steps, operations, parts, components and/or combinations thereof.

It should be noted that the terms "first", "second" and the like in the specification and claims of the present disclosure and above-mentioned drawings may be used to distinguish similar objects and may not be necessarily used to describe a specific order or sequence. It should be understood that the data used may be interchangeable under suitable circumstances, such that embodiments described in the present disclosure may be practiced in sequences other than those illustrated or described herein.

The present disclosure has been described through above-described embodiments, but it should be understood that above-described embodiments may be for exemplary and illustrative purpose only and may not be intended to limit the present disclosure to the scope of described embodiments. In addition, those skilled in the art may understand that the present disclosure may not be limited to above-mentioned embodiments; and other variations and modifications may be made based on embodiments of the present disclosure. These variations and modifications may all be within the protection scope claimed by the present disclosure. The protection scope of the present disclosure is defined by the appended claims and their equivalents.

What is claimed is:

1. An electronic device, comprising:
a first main body, a second main body, and a rotating-axle apparatus, wherein the rotating-axle apparatus connects the first main body with the second main body to make the second main body at an open state or a closed state relative to the first main body; and an air outlet is disposed on a side of the first main body,
wherein:
the rotating-axle apparatus is configured to, in a process of rotating the second main body around a rotation center to the open state, drive the second main body to ascend along a first direction relative to the first main body and move above the first main body to expose the air outlet;
the rotating-axle apparatus includes a first hinge unit combined with the first main body, a second hinge unit combined with the second main body, and a connecting unit configured to connect the first hinge unit with the second hinge unit;
the rotation center is formed at the second hinge unit, and in the process of rotating the second main body to the open state, the rotation center moves along the first direction to gradually move away from the first hinge unit;
the connecting unit includes a guiding part and a rotating part; the guiding part is disposed on the first hinge unit; and the rotating part is coupled with the second hinge unit and the guiding part to move the second hinge unit along the guiding part in the process of rotating the second main body; and
the second hinge unit includes a rotating axle, and a central axis of the rotating axle forms the rotation center.

2. The electronic device according to claim 1, wherein:
the first main body includes a top surface and a bottom surface disposed oppositely along the first direction; when the second main body is at the closed state relative to the first main body, the rotation center is between the top surface and the bottom surface; and when the second main body is rotated relative to the first main body to the open state, the rotation center is above the top surface.

3. The electronic device according to claim 1, wherein:
the second hinge unit further includes a connecting part and a gear;
the rotating axle extends from one end of the connecting part; and
the gear is sleeved on the rotating axle and capable of rotating with the rotating axle.

4. The electronic device according to claim 3, wherein:
the guiding part includes a rack; and the rotating part is meshed with the gear and the rack respectively.

5. The electronic device according to claim 3, wherein:
the second hinge unit further includes an installation bracket; the installation bracket is fixedly disposed relative to the rotating axle; and the rotating part is rotationally disposed on the installation bracket and meshed with the gear.

6. The electronic device according to claim 5, wherein:
the second hinge unit further includes a torsion assembly; the torsion assembly passes through the rotating axle; and along an axial direction of the rotating axle, the gear and the torsion assembly are respectively on two sides of the installation bracket.

7. The electronic device according to claim 5, wherein:
a hinge housing is disposed on the rotating axle; the hinge housing and the installation bracket are enclosed to form an accommodating space; and the rotating part, the gear and the guiding part are all in the accommodating space.

8. The electronic device according to claim 7, wherein:
the hinge housing includes a first housing and a second housing opposite to the first housing.

9. A state switching method, applied to an electronic device, wherein the electronic device includes a first main body, a second main body, and a rotating-axle apparatus, the method comprising:

rotating the second main body around a rotation center to make the rotation center ascend to above the first main body along a first direction, such that the second main body is switched from a closed state to an open state relative to the first main body; and rotating the second main body around the rotation center to make the rotation center descend from above the first main body to inside the first main body along the first direction, such that the second main body is switched from the open state to the closed state relative to the first main body;

wherein:

the rotating-axle apparatus includes a first hinge unit combined with the first main body, a second hinge unit combined with the second main body, and a connecting unit configured to connect the first hinge unit with the second hinge unit;

the rotation center is formed at the second hinge unit, and in the process of rotating the second main body to the open state, the rotation center moves along the first direction to gradually move away from the first hinge unit;

the connecting unit includes a guiding part and a rotating part; the guiding part is disposed on the first hinge unit; and the rotating part is coupled with the second hinge unit and the guiding part to move the second hinge unit along the guiding part in the process of rotating the second main body; and the second hinge unit includes a rotating axle, and a central axis of the rotating axle forms the rotation center.

10. The state switching method according to claim 9, wherein:

the first main body includes a top surface and a bottom surface disposed oppositely along the first direction; when the second main body is at the closed state relative to the first main body, the rotation center is between the top surface and the bottom surface; and when the second main body is rotated relative to the first main body to the open state, the rotation center is above the top surface.

11. The state switching method according to claim 9, wherein:

the second hinge unit includes a connecting part and a gear;

the rotating axle extends from one end of the connecting part; and the gear is sleeved on the rotating axle and capable of rotating with the rotating axle.

12. The state switching method according to claim 11, wherein:

the guiding part includes a rack; and the rotating part is meshed with the gear and the rack respectively.

13. The state switching method according to claim 11, wherein:

the second hinge unit further includes an installation bracket; the installation bracket is fixedly disposed relative to the rotating axle; and the rotating part is rotationally disposed on the installation bracket and meshed with the gear.

14. The state switching method according to claim 13, wherein:

the second hinge unit further includes a torsion assembly; the torsion assembly is sleeved on the rotating axle; and along an axial direction of the rotating axle, the gear and the torsion assembly are respectively on two sides of the installation bracket.

15. The state switching method according to claim 13, wherein:

a hinge housing is disposed on the rotating axle; the hinge housing and the installation bracket are enclosed to form an accommodating space; and the rotating part, the gear and the guiding part are all in the accommodating space.

16. The state switching method according to claim 15, wherein:

the hinge housing includes a first housing and a second housing opposite to the first housing.

* * * * *